UNITED STATES PATENT OFFICE.

GEORGE W. CHILDS, OF NEW YORK, N. Y.

PROCESS FOR MAKING LEATHER-DRESSING FROM SAPPED OR EXHAUSTED TANNING LIQUORS.

No. 882,489.
Specification of Letters Patent.
Patented March 17, 1908.

Application filed May 16, 1906. Serial No. 317,141.

*To all whom it may concern:*

Be it known that I, GEORGE W. CHILDS, of New York city, in the county and State of New York, have invented a certain new and useful Improvement in Processes for Making Leather-Dressing from Sapped or Exhausted Tanning Liquors, whereof the following is a specification.

It is the object of my invention to utilize tanning liquors which have become so far sapped or exhausted by contact with hides as to be no longer available for tanning in the particular yard in which they have been employed. Such sapped liquors being usually polluted with chemicals introduced thereto, as sulfuric acid or lime, or resulting from chemical changes therein, as acetic, propionic or butyric acids or lime compounds, and carrying a large percentage of non-tannic material, are termed "runaway" or "tail" liquors and are ordinarily discharged to waste from the last layer in which they have been sapped. For instance, a typical ordinary acid tanning yard would comprise five or more layers or vats containing bodies of tanning liquors of different strengths and containing sulfuric acid, the strongest of which would be supplied with tanning liquor of approximately 35° barkometer, which when sapped by the hides in the last layer would be supplied to the first or other layers of less strength, and thus used until its proportion of tannin is so low and its proportion of non-tannic elements (both organic and non-organic) is so high that its use is no longer economical, because of its slow action upon the hides, and it is discharged to waste regardless of its tannin value. Similarly, a typical ordinary non-acid tanning yard would comprise a series of five or more layers, the strongest of which would receive a tanning liquor of from 16° to 35° barkometer, which being sapped and transferred to weaker layers or handlers, would be discharged to waste from the weakest layer at from 8° to 10° barkometer, then containing a large proportion of non-tannic ingredients (both organic and non-organic) and such a small proportion of tannin that its use is no longer economical. Such spent or runaway liquors are impregnated with some or all of the following non-tannic ingredients:—lime, lime compounds, volatile and non-volatile acids and organic filth. The presence of an excessive amount of any such impurities always interferes with the action of the tannin on the hides, and particularly when the tanning liquor has been depleted by contact with the hides; so that although said spent liquors contain more or less tannin, the latter is unavailable for further action on the hides and the liquor containing it must be discarded with consequent loss to the tanner.

In accordance with my present process, as hereinafter described, such runaway or tail liquors may be purified and concentrated to a specific gravity of from 1.05 to 1.3 and are thereby made available for impregnating leather to increase its ultimate solidity.

The purification above contemplated may be effected as follows:—If the spent liquor contains mineral impurities, such as lime or lime compounds, these constituents may be precipitated by the addition of chemicals forming insoluble compounds with lime, for instance, ammonium oxalate, sodium phosphate, sodium fluorid, or carbon dioxid gas may be employed to effect such precipitation. The precipitate is then settled out and the supernatant liquor run off for further purification or concentration. If the liquor contains non-volatile impurities such as mineral acids, these may be either neutralized by the addition of alkali, such as sodium hydrate or potassium hydrate, or may be precipitated by the addition of bases forming insoluble compounds with the acids, such as barium chlorid. Spent liquors partially purified as aforesaid may then be concentrated to the consistency specified for the purpose of removing volatile impurities and with the effect of reducing the liquors to a form in which the otherwise useless tannin and solid matter therein become available. Of course, such reduction in the bulk of the purified liquors also facilitates their transportation. The otherwise waste liquors thus purified and concentrated may be utilized to increase the solidity of leather, as follows:—Hides which have been treated in vats with a tanning solution until they are colored through, are then impregnated with a concentrate obtained as above described. For instance, such leather may be placed in a rotary drum and said concentrate, preferably heated, introduced to said drum, conveniently through a hollow axle or trunnion thereof, and the revolution of said drum continued until the leather absorbs the concentrate. Leather treated as last described may then be bleached, oiled, dried, dampened and rolled in the usual manner.

A process for treating leather with concentrated waste tanning liquor, as above contemplated, forms the subject-matter of my application Serial No. 327,029, filed July 20, 1906, for Letters-Patent of the United States, and, a leather dressing containing inert solid matter residue of waste tanning liquor treated as above contemplated, forms the subject-matter of my application Serial No. 394,303, filed September 24, 1907, for Letters-Patent of the United States.

I do not desire to limit myself to all the details of procedure above enumerated, as various modifications may be made therein without departing from the essential features of my invention. For instance, some waste liquors will require all of the above purifying steps, others will require some, and in a few cases concentration of the waste liquor to the proper consistency will be all that is required.

I claim:—

1. The process of treating sapped or exhausted organic tan liquors and adapting them for impregnating leather, which consists in neutralizing mineral acid impurities therein, by adding an alkali adapted to form a precipitate; separating the precipitate and concentrating the resultant liquid to a specific gravity of from 1.05 to 1.3.

2. The process of treating sapped or exhausted organic tan liquors, and adapting them for impregnating leather, which consists in neutralizing mineral acid impurities therein, by adding alkali, and concentrating the resultant liquid to a specific gravity of from 1.05 to 1.3.

3. The process of treating sapped or exhausted organic tan liquors and adapting them for impregnating leather, which consists in precipitating sulfuric acid therein, in combination with a barium derivative, by adding the latter and concentrating the resultant liquid to a specific gravity of from 1.05 to 1.3.

In testimony whereof I have hereunto signed my name at New York city in the county of New York and State of New York, this 14th day of May, 1906.

GEORGE W. CHILDS.

Witnesses:
F. P. POLEN,
R. J. CUMMINGS.